May 21, 1940.  W. D. LA MONT  2,201,615
HYDROELECTRIC STEAM POWER GENERATING STATION INCLUDING PLURAL PRIME
MOVERS AND METHOD OF OPERATING SAID STATION AND SAID PRIME MOVERS
Original Filed Aug. 5, 1933   3 Sheets-Sheet 1
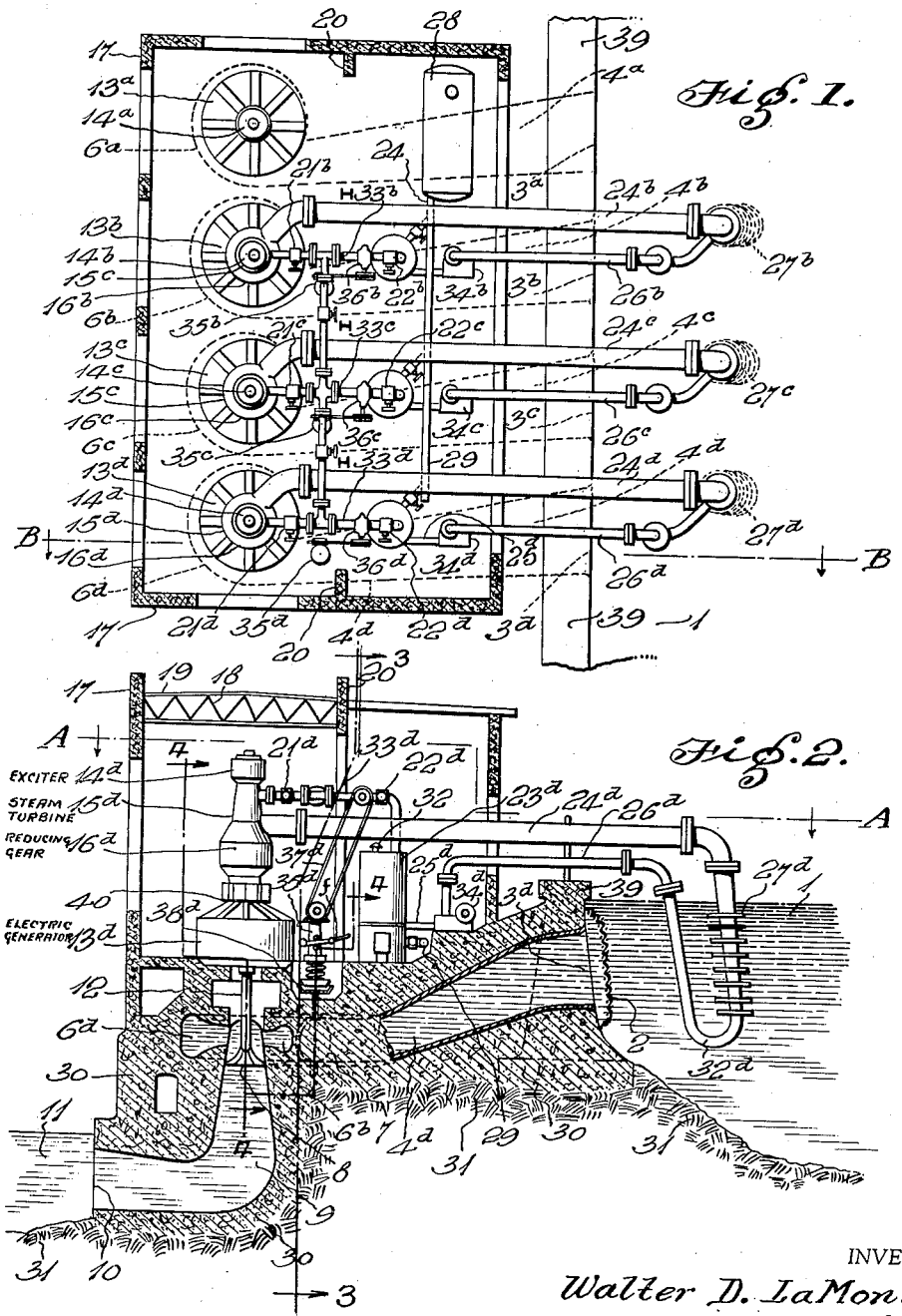
INVENTOR.
Walter D. LaMont
BY
Robert Kemp
ATTORNEY.

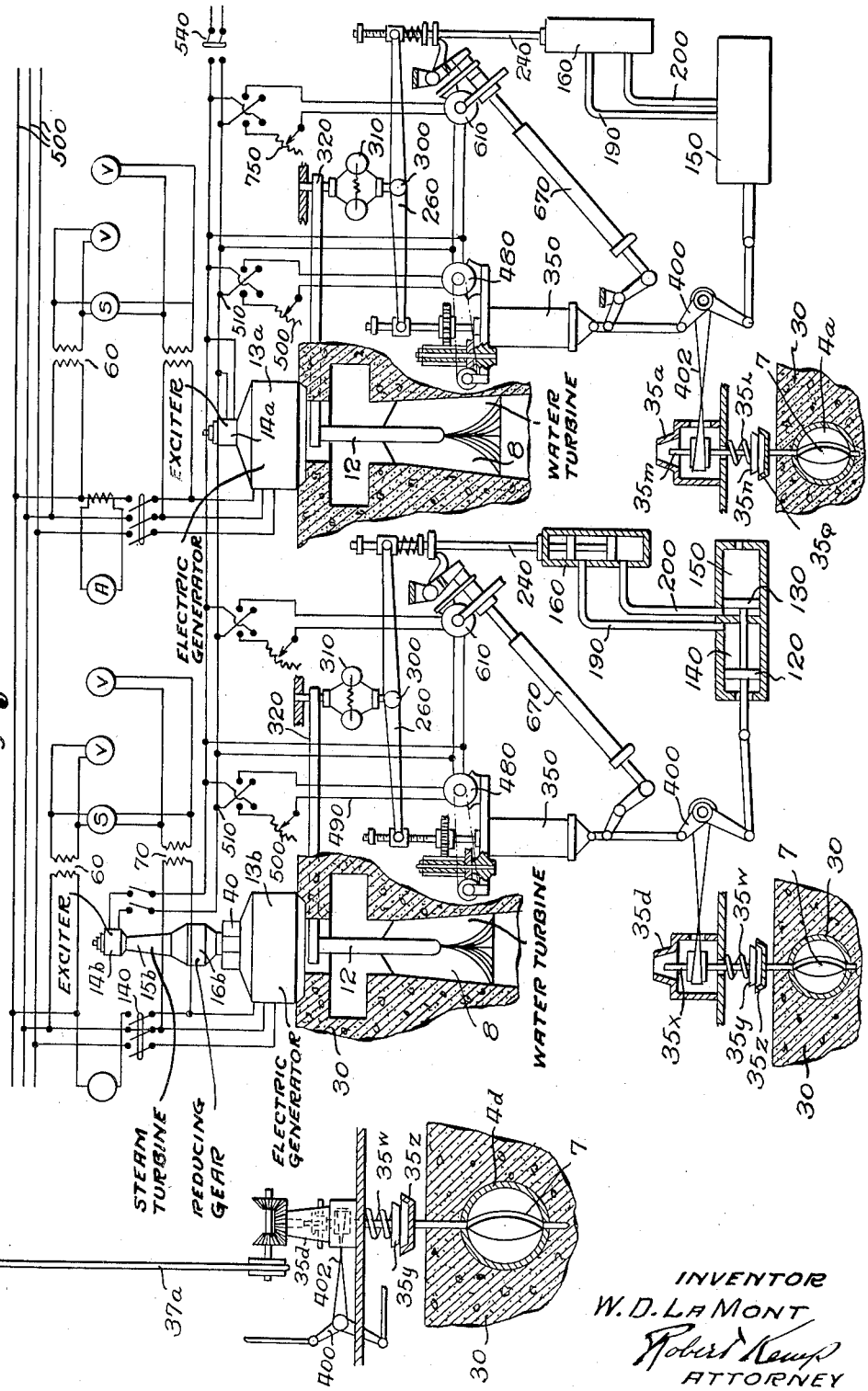

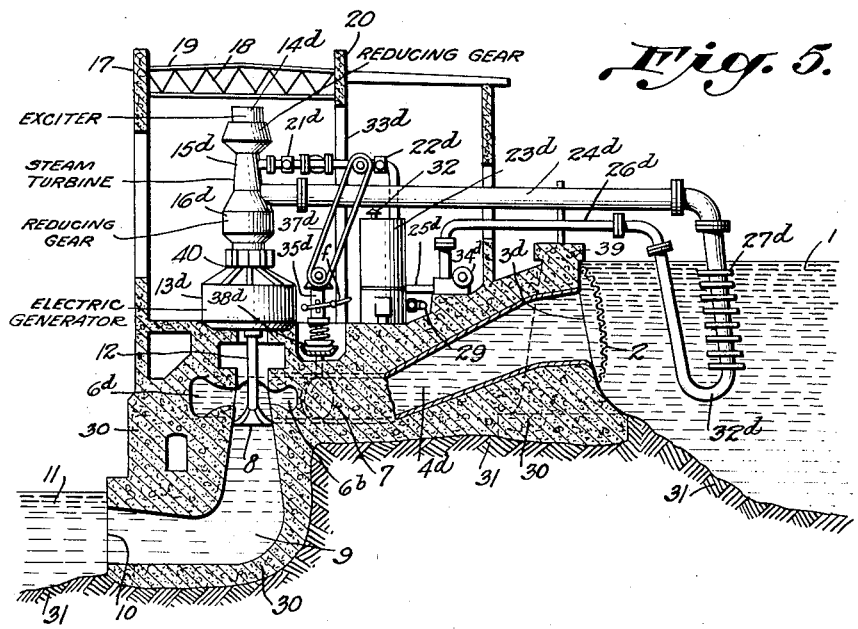
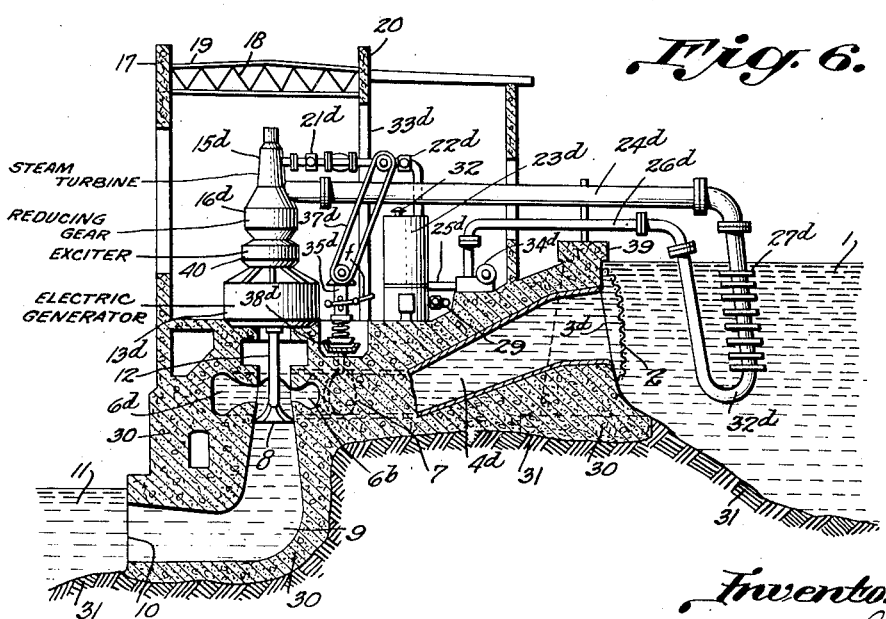

Patented May 21, 1940

2,201,615

UNITED STATES PATENT OFFICE 2,201,615

HYDROELECTRIC STEAM POWER GENERATING STATION INCLUDING PLURAL PRIME MOVERS AND METHOD OF OPERATING SAID STATION AND SAID PRIME MOVERS

Walter Douglas La Mont, New York, N. Y., assignor to W. D. La Mont Inc., Wilmington, Del., a corporation of Delaware Application August 5, 1933, Serial No. 683,873
Renewed November 11, 1937

24 Claims. (Cl. 290—4)

This invention relates to a hydroelectric steam power plant and method of operating the same. It also concerns prime movers and more particularly a prime mover of the hydroelectric steam type.

Hydroelectric power is variable in its availability. If it is being taken from the tides, it diminishes as the tide turns from ebb to flow, or from flow to ebb, this form of power being most available when the tide is running strongest in either direction. Taken from a stream or a river, hydroelectric power is apt to be seasonal, varying upwards or downwards in its supply with the rainy or dry periods of the year.

These conditions usually necessitate the situation of a so-called "standby" steam power plant near the hydroelectric power plant, this standby steam power plant being idle during a large part of the time.

Even though it is idle a large part of the day, or of the year, it must of necessity have not only its boilers, steam turbines, auxiliaries, etc., but it usually has its full complement of electric generators, switchboards, transformers and the like, increasing the capital expenditure of the hydroelectric power plant as a whole, thereby removing certain of the hydroelectric plant's attractive features, such as low first cost and other lower labor and maintenance charges incident to its continued operation as an electric current producer.

The main object of my invention is to eliminate the need for, and thereby save the erection, maintenance and operation costs of all steam standby stations used in connection with hydroelectric power plants.

In the present instance, I accomplish this object by the installation and use with, and attached to and made a part of the hydroelectric machinery, a small, compact, lightweight, low cost, heavy duty, long life, so-called "aircraft type" steam power producing apparatus, geared to the hydroelectric generators and water wheels and utilizing preferably the same hydroelectric governor, switchboards, transformers, protective devices, etc., as are used when the hydroelectric power station is operating by itself, and sending out its own electric current across its own switchboards.

In accomplishing this object I use a high speed steam generator or steam boiler, a small light weight high speed turbine operated by steam, a reducing gear attached to and made a part of the turbine, the shaft of the turbine and reducing gear being coupled directly or indirectly to the electric generator-water wheel shaft. At the other end of the turbine shaft, that is the end that is not next to the reducing gear, I preferably mount a small electric generator known as an exciter which furnishes the necessary excitation current for the large electrical generator normally attached to the water turbine.

It is customary in hydraulic electrical installation for the turbine wheels to be either horizontal or vertical, the electrical generator and the electrical exciter being in the same position as the turbine. In the present instance I show in my drawings a vertical so-called low head hydroelectric installation. In one unit the exciter is mounted directly on top of the generator, the steam turbine and reducing gear unit being absent, whereas in the other three units the generator is positioned in its customary place over the water wheel in each instance and a reducing gear turbine exciter combination attached to the top of the generator casing and operating on the same shaft as the generator and the turbine. It is my preference also to mount a high speed steam generator in the power house near the steam turbine and to lead off the exhaust steam into a condenser which may be either air cooled or water cooled, but preferably the latter. If there is use for low pressure exhaust steam issuing from the turbine the condenser can be omitted.

Before my present invention of a plural prime mover of the character to which I refer, most of the hydroelectric power generating stations governed the supply of water going to each water wheel separately by individual governor mechanisms operating near each generator and controlling the water gate or valve admitting water to the turbine wheel of that particular generator. When there was not sufficient water in the fore bay of the power house to operate all of the water wheels certain of the wheels would be supplied with their water by the closing of the particular valves which governed the water going to other wheels, the power house then operating only such wheels with their generators that could use the supply of water available. Such water wheels as are used usually operate most efficiently running with their full supply of water, and this meant that to give them less than their customary supply or in other words to operate all of the wheels with less water than they would fully take would be to reduce the efficiency of the hydroelectric installation as a whole to a greater extent than would be accomplished by the usual cut-out method of giving water to certain wheels in their full requirement and giving some water wheels no water at all.

If the power station happened to be in a river, water supply fluctuates seasonally. If the power station is in the nature of a tide mill, operating from the rise and fall of ocean tides, the water supply fluctuates every time the tide turns. At such times as the water supply is limited, in the case of the river, or as the tide is turning, as in the case of a tidal hydroelectric installation, a standby steam power station is needed which will then take up the electric load and continue to supply the electric transmission lines with electric current required to make up the difference in power output which is not coming at such times from the hydroelectric power plant itself.

In power stations of the hydroelectric type operating in rivers where water supply fluctuation is seasonal and where my invention is not used it is found that before the dry season of the year has fully arrived and before it has fully passed that is in the late spring months and in the early fall both hydroelectric station and its steam standby station operate at reduced efficiency and high cost. In the meantime, that is during the wet and dry season, either the hydroelectric plant furnishes all the power demanded by consumers of electricity whose electrical equipment is connected to the transmission line, that is during the wet season, or the steam power plant is carrying the load and operating at its best efficiency, that is during the dry season. In any event the steam power plant would be standing idle until it would be needed during the dry season and with its mass of steam-generating power-producing and electrical equipment it represented a heavy investment required to pick up the load when it was not being delivered by the water power plant.

It is this particular condition with all of its attendant high costs of installation, operation and maintenance that my improved plural prime mover or hydroelectric steam power plant is directly designed to obviate, and by my new method of machinery installation and operation large savings are effected which would otherwise be impossible.

With these and other objects and features my invention is concerned, as will be more clearly disclosed on the accompanying drawings and description forming a part of my present patent application.

In the drawings:

Fig. 1 is a plan view in cut section along the lines A—A in Fig. 2,

Fig. 2 is a side elevation showing parts in section along the line B—B in Fig. 1.

Fig. 3 is a sectional view with parts cut away along the line 3—3 in Figure 2, showing the movable belt or chain connection between the governor and steam throttle.

Fig. 4 is a vertical elevation with parts in section of the governor and control mechanism as adapted and used by the applicant and as disclosed in part in U. S. Patent No. 1,684,884, wherein each generator is equipped with said governor and control mechanism and its accompanying electric lines to simultaneously or separately control the movement of water and the movement of steam causing the movement of the rotor of the electric generator and the generation of electric power by said rotor movement.

Fig. 4 is a view taken along the line 4—4 in Figure 2.

Fig. 5 is an elevational and sectional view of my power plant, in which the exciter is placed in operative position on top of a reducing gear which is mounted on the steam turbine.

Fig. 6 is an elevational and sectional view of my power plant, in which the exciter is placed in operative position between the hydraulic turbine and the speed reducing gear.

The drawings show a hydroelectric installation, the customary fore bay designated as 1 delivering water through screen 2 and pipe 4d to water wheel 8 thence through pipe or tailstock 9 into lower pool 11. As the water enters at 3d and passes down through penstock 4d its supply is controlled directly by valve 7 actuated by an electrically controlled governor 35d. As the water passes valve 7 it swings around a vortex chamber 6d falling down through the blades of water turbine 8 thus causing the rotation of vertical shaft 12 which produces electric energy by the rotation of the armature in electric generator 13d. All of this takes place in the base of the power house which is preferably cast of concrete and designated as 30 on the drawings, 31 showing the earth structure under the concrete and water on which the dam and power house sit and to which the dam 39 is anchored, this foundation 30 usually being not of earth but of good solid rock.

Around the top of each generator is a platform 40 with a hand railing and in the usual power installation where my invention is not employed an exciter designated in the present instance by the numeral 14a, since it is in this instance shown mounted directly on the generator in the applicant's drawings.

Four hydroelectric installations appear in the plan view in Fig. 1. Three of these units are plural prime movers constructed and installed in accordance with my invention, the fourth water wheel and turbine being minus any steam turbine or reducing gear. All of said units are preferably provided with exciters.

The power house itself is designated in the drawings at 20, dam 39 being on one side or at the back of the power house, and wall 17 at the front of the power house. A roof 19 is supported by structural girder members 18 providing shelter for the machinery.

There are four power units in the power house the a unit which is not provided with a steam turbine and reducing gear but which does have an exciter, and the b, c, and d units which are plural hydroelectric steam prime movers made in accordance with my invention.

Each of the b, c, and d units are preferably provided with their own steam generator, their own condenser, water wheel, electric generator, reducing gear, and exciter combination which are not only connected together as individual hydroelectric steam power plants, but which are interconnected through common connecting fuel and steam pipe lines which enable one or two boilers for example to run two or more steam turbines as conditions in the power house may require in order to secure the lowest cost and most efficient power plant operation.

Taking the d group as an example of the best practice in carrying out my invention I show the boiler 23d receiving fuel from fuel oil tank 28 through fuel pipe line 24 and its branch 29 valvularly controlled and supplying fuel to boiler 23d. This boiler is provided with a safety valve 32, which while not shown on each boiler nevertheless is made a part of the equipment of each boiler. Steam from the boiler passes through valve 22d and pipe 33d also valve 21d into turbine 15d where it is expanded and where it drives reducing gears designated in the present instance by reducing gear case 16d. On top of turbine 15d exciter 14d may be situated as shown in the drawings. It is also within the province of the present invention to place a small set of gears as shown in Fig. 5 between the steam turbine 15d and the exciter 14d so that the exciter may run at the same speed as the turbine 13d.

Governor 35d, operated electrically and in accordance with the demand for power and the need for synchronizing the electrical units normally is connected to and controls the movement of valve 7. In the drawings I show how a clutch 38d actuated by a lever may be used to disconnect the gate controlling the water so that the governor may then only control through flexible chain 37d throttle valve 36d admitting or cutting off steam going to turbine 15d.

When the turbine has expanded and obtained power from the steam coming from boiler 23d the steam then leaves the turbine through steam exhaust pipe 24d turning and going down through water cooled condensers 27d situated in the water of the fore bay 1. At the lower part of the condenser shown as pipe bend 32d condenser water is collected and withdrawn by pump 34d, feeding the boiler through boiler feed pipe 25d.

Similar numerals with the designation letter c and b indicate similar parts in the two middle plural prime mover installations situated between the two end units in the plan view in Fig. 1.

The operation of my improved plural prime mover is not only simple but relatively automatic either when operated in single units or in groups of units. The high speed steam generators are preferably those employing long small tubes in boilers of the water tube type having long heat lanes, high velocity water circulation, and so forth. While they may use coal or powdered coal as fuel, I prefer the use of even more fluid fuels such as oils which can be divided with extreme fineness and place in aerial suspension in air going at high velocity into the combustion chamber of the boiler or fuel gases such as artificial or even better natural gas which can be completely mixed with air and forced into the boiler or steam generator fire blocks under relatively high pressures and burned at correspondingly high velocity. The essence of boiler operations must be speed, because high speeds reduce the size, weight, and cost of steam generating apparatus of this character.

Automatic equipment for controlling and governing all apparatus I do not describe in detail although I of course make full use of it in plant operation.

Figure 3 is an elevational view partially in section and taken along the lines 3—3 as indicated in Figure 2. Numeral 400 (equivalent to numeral 40 in the Patent to Pfau, #1,684,884) in Figure 3 shows the bell crank of the electric governor moving a partially twisted belt 402, to control through governor control post 35d, and belt or chain 37d, the movement of steam throttle 36d. Through a forked lever f shown more clearly on Figure 2, the clutch member 35y is engaged or disengaged with dished disc member 35z through customary sliding shafts and collars which are old in the clutch art and therefore not shown or described in post 35d in further detail. At governor control post 35a shown in Figure 4, a similar arrangement of parts exists, shaft member 35m of the clutch member 35n normally held down into dished disc 35q by spring 35l (equivalent to spring 35w).

In Figure 4, the remaining numerals on the governing mechanism are numbered for the most part, (that is, with the exception of the parts referred to elsewhere in this specification) with the same numbers used in the patent to Pfau mentioned above. After each of the Pfau patent numerals the applicant has placed a zero.

Therefore, it is unnecessary to cover in the present patent application how the Pfau equipment for electric governing of turbine wheels operates. It is sufficient to state that the details of the operation of this electric governing apparatus may be found in the Pfau patent, and that these details may be transposed to the applicant's invention by adding the zero to each of Pfau's numerals and reading the numerals separately over onto the applicant's Figure 4 as shown.

The applicant uses a Pfau governing device for each and every power unit in his hydroelectric steam power generating station. The Pfau device at each of the a, b, c and d units governs the flow of water to the turbine, and at the b, c, and d units, also governs the flow of steam, through governed throttle valves 36b, 36c and 36d, to the steam turbines 15b, 15c and 15d respectively. Each of the governor posts 35b, 35c and 35d are connected to the hydraulic valve through a similar clutch mechanism, each of which enables the electrically governed operation of water flow to the hydraulic turbine and/or steam flow to the steam turbine to be electrically closely governed either separately or simultaneously on each b, c, and d units or at the convenience of the power plant operator. All Pfau devices used are interconnected electrically.

If the operator desires to cut out the flow of either or both water or steam which is moving, through the movement of turbine wheels, their respective electric generators, this may be done by setting or closing the steam valves 22b, 22c or 22d, at the same time closing the butterfly valve on the water supply to any specific turbine receiving water. On the other hand, if the power station operator desires to run only on steam at any unit, he merely closes his water valve at that point, disengages his clutch mechanism by lifting up his forked lever member f which is designed to stay in any position it is placed regardless of the compression load on the spring which holds the clutch closed. His water valve is off and he is controlling that particular power unit in the power house through his steam throttle valve.

Common steam lines interconnect each of the steam turbines, common electric lines connect each of the electric generators, a common source of water supplies any and/or all of the hydraulic turbines with water, and common fuel lines serve any and/or all boilers with fluid fuel. The use of fuel that is fluid and susceptible to extremely fine division in an air stream provides flexibility of operation in my steam generation apparatus which is designed and created to stop and start with the utmost ease, and vary its load and speed of operation almost instantaneously, and occupy the minimum amount of floor space possible.

When the electric loads demand requires more electricity than the water wheels can furnish due to low water conditions, the power station attendant will close the water gate to one or more of the turbines of my plural prime mover type, immediately swing the boiler or high speed generator of that unit into action which will promptly commence to deliver steam at high pressures to turbine 15d through reducing gear 16d continuing the rotation of generator 13d even though no water may be flowing through water wheel 8 or through any similar water wheel or turbine on any of the other units, which at the moment are going through the same maneuvers.

In other words, as the water in fore bay 1 lessens, the water in the penstocks connecting the turbines of the plural prime movers with the fore bay may be cut off from these water turbines by their respective water valves thus maintaining the high water level in fore bay 1 and enabling such turbines as are continuing to operate, to run at high efficiency hydraulic conditions.

My steam circuits are preferably closed to the atmosphere and because of the small diameter tubes used in the high speed steam generators I use where possible distilled water. This gives no opportunity for carbonate or other deposits in the boilers or their tubes.

When the governor which electrically controls the water valve is disconnected from its valve by clutch or other means it is then free to control the throttle in the steam line of that particular prime mover and give the steam turbine operating the upper end of the electrical generator shaft the same control that the water turbine at the lower end of this shaft would receive from the same governor when the clutch was permitting it to turn the water valve automatically.

In governing the hydraulic turbine I propose to use the customary controlling means for such prime movers as for example that form of control disclosed in Patent 1,684,884, said control being provided with a clutch mechanism in the shaft between the control and the water valve, which clutch mechanism will permit the valve to be controlled so that no water can flow through the pipe supplying water to the hydraulic turbine, thereby allowing the governor to operate independently of the water control valve and control the throttle in the case of each unit, which leads or controls the steam between the boiler and the steam turbine.

It is understood that complete system of electric wiring as is customary in power house practice, that is in hydro-electric stations, interconnects the generators, exciters, and governors and switchboards in the power house, the wiring in the present instance being concealed and although not in the drawings it definitely forms a part of the specification and is understood to convey the electric current to the individual governing mechanisms which control the water or the steam supply to the water turbine or the steam turbine in each separate instance. It is also understood that the exciter used in connection with the larger generator may be placed in its customary position on top of the generator and geared to the steam turbine through the common vertical shaft which connects water turbine, generator, and reducing gear as shown in Fig. 6. The reducing gear is necessarily preferred because a steam turbine of the proper small size would operate say between sixteen to twenty thousand R. P. M. whereas the hydraulic turbine would turn at a much slower speed, say a few hundred R. P. M. this latter speed being the speed of the generator directly connected at one end of the vertical shaft to the hydraulic turbine and at the other end of its vertical shaft (the same shaft) to the exciter or to the reducing gears which are in turn connected to the high speed steam turbine.

It is further within the scope of the present invention to operate the steam turbines right along with the water turbines to drive the generator if the power house management desires to do this. In such case the clutch between the electric governor would be closed and the governor would simultaneously operate the water valve controlling the water going to the hydraulic turbines and the steam going to the steam turbine.

My invention resides not only in my plural prime mover but in the relation of the parts driving the prime mover, the automatic governing of the same, the plan of the power house and the general lay-out of th entire hydroelectric steam power station. I do not desire to limit my invention except as outlined in the accompanying claims.

I claim:

1. In a hydroelectric steam power plant for generating electric power by the flow of water from a higher water level to a lower water level, the combination, in apparatus for electric power generation, comprising a hydraulic turbine, an electric generator driven by said turbine and a prime mover driven by steam operatively connected to said electric generator to drive the same, a steam boiler connected to said steam turbine and an electrically controlled governor governing the flow of water to said hydraulic turbine and the flow of steam from said steam boiler to said steam turbine, and a speed reducing mechanism between said driving means and said hydraulic turbine said speed reducing mechanism firmly attached to said turbine.

2. In a hydroelectric steam power plant for generating electric power by the flow of water from a higher water level to a lower water level, a plurality of interconnected power generating units, each unit consisting of a hydraulic turbine rotatively connected to an electric generator and a reducing gear, a steam turbine for driving said reducing gear driving said generator mounted as a unitary structure and a common governing means for controlling said hydraulic turbine and said steam turbine.

3. A method of operating a hydroelectric steam power plant including several power producing units, each unit having a hydraulic turbine connected to a steam prime mover by speed reducing mechanism attached to an electric generator in operative relation thereto, said method of electric power generation comprising admitting water to a hydraulic turbine and thus revolving an electric generator, admitting steam to a steam turbine and admitting water to a second hydraulic turbine operatively attached to said steam turbine and thus revolving another electric generator, admitting water to a hydraulic turbine and thus revolving a third electric generator and delivering said electricity so generated to common power lines.

4. A method of operating a hydroelectric steam power plant including a plurality of hydraulic turbines each connected to a steam prime mover by a speed reducing mechanism attached to an electric generator in operative relation thereto, said method which comprises admitting water to a hydraulic turbine and thus revolving a generator, admitting water to another hydraulic turbine and simultaneously admitting steam to a steam prime mover thus revolving another generator and delivering electricity so generated to common power lines.

5. A method of operating a hydroelectric steam power plant including a plurality of hydraulic turbines each connected to a steam prime-mover by a speed reducing mechanism attached to an electric generator in operative relation thereto, said method comprising admitting steam to a plurality of steam prime movers thus revolving a plurality of water driven generators by the expansion of steam and delivering electricity so generated to common power lines.

6. A method of operating a hydroelectric steam power plant including a plurality of hydraulic turbines each connected to a steam prime mover by a speed reducing mechanism attached to an electric generator in operative relation thereto said method which comprises the steps of shutting off the supply of driving water used to revolve a plurality of water turbines driving electric generators and admitting steam to a plurality of steam prime movers thus revolving said generators by steam from a common source of steam.

7. A method of operating a hydroelectric steam power station including a plurality of hydraulic turbines each connected to a steam prime mover by a speed reducing mechanism attached to an electric generator in operative relation thereto, said method comprising the steps of admitting water to a plurality of water turbines and admitting steam to a plurality of steam turbines and thus revolving a group of electric generators part of the operating time by the movement of water and part of the time by the expansion of steam.

8. A method of operating a hydroelectric steam power station including a plurality of hydraulic turbines each connected to a steam prime mover by a speed reducing mechanism attached to an electric generator in operative relation thereto which comprises admitting water to a plurality of water turbines and admitting steam to a plurality of steam turbines thus revolving a group of electric generators partially by moving water and partially by expanding steam.

9. In hydroelectric steam power plant, apparatus, the combination comprising a hydraulic turbine operatively connected to an electric generator, a reducing gear, and a steam turbine wherein the reducing gear forms a driving connection between the steam turbine and said electric generator and the hydraulic turbine is in driving relation with said electric generator, control means governing water supplied to said hydraulic turbine, control means governing the amount of steam supplied to said steam turbine and a clutch for disconnecting and connecting both said control means.

10. In hydroelectric steam power plant apparatus, the combination comprising a hydraulic turbine operatively connected to an electric generator, a speed reducing mechanism and a steam prime mover wherein the reducing mechanism forms a driving connection between the steam prime mover and said electric generator and the hydraulic turbine is in driving relation with the electric generator, control means controlling water supplied to said hydraulic turbine, control means controlling steam supplied to said steam turbine and means for interconnecting and disconnecting said control means from each other.

11. In hydroelectric steam power plant apparatus, the combination comprising a hydraulic turbine operatively connected to an electric generator, a reducing gear and a steam turbine wherein the reducing gear forms a driving connection between the steam turbine and said electric generator and the hydraulic turbine is in driving relation with said electric generator, a steam control valve, a water control valve, electrically actuated control means controlling water to be supplied to said turbine and steam to be supplied to said steam turbine, and means for disconnecting the steam control valve and its movement from the water control valve and its movement.

12. In hydroelectric steam power plant apparatus, a hydraulic turbine operatively connected to an electric generator, a speed reducing gear mechanism and a steam turbine wherein the reducing gear forms a driving connection between the steam turbine and said electric generator and the hydraulic turbine is in driving relation with said electric generator, a steam control valve, a water control valve, electric governing controls controlling both said valves, and means for disassociating the movement of said steam control valve from said water control valve.

13. In an apparatus of the class described, a hydraulic turbine, an electric generator driven by said hydraulic turbine, a steam actuated prime mover connected to said electric generator for imparting driving movement thereto, a steam boiler connected to said prime mover, an electrically controlled governor for controlling the flow of water to said hydraulic turbine and the flow of steam from said steam boiler to said steam prime mover, and a speed-reducing mechanism firmly attached to said steam prime mover therebetween and said electric generator.

14. In an apparatus of the class described, a plurality of interconnected power generating units, each of said units comprising a hydraulic turbine, a steam turbine, and an electric generator connected to said turbines, a reducing gear disposed between said steam turbine and said electric generator, and a common governing means for controlling said hydraulic turbine and said steam turbine.

15. A method of operating a hydroelectric steam power plant including several power producing units, each unit having an electric generator connected to a hydraulic turbine and to a steam prime mover through the intermediary of a speed reducing mechanism, which method comprises admitting water to a hydraulic turbine to revolve the electric generator connected thereto, admitting steam to a steam turbine, admitting water to a second hydraulic turbine operatively attached to said steam turbine to revolve another electric generator, admitting water to a third hydraulic turbine to revolve a third electric generator, and delivering the electricity so generated to common power lines.

16. A method of operating a hydroelectric steam power plant including a plurality of electric generators each connected to a hydraulic turbine and to a steam prime mover by a speed reducing mechanism, which method comprises admitting water to a hydraulic turbine and thus revolving a generator, admitting water to another hydraulic turbine and simultaneously admitting steam to a steam prime mover thus revolving another electric generator, and delivering electricity so generated to common power lines.

17. A method of operating a hydroelectric steam power plant including a plurality of electric generators each connected to a hydraulic turbine and to a steam prime mover by a speed reducing mechanism, which method comprises admitting steam to a plurality of steam prime movers thus revolving a plurality of water driven electric generators by the expansion of steam, and delivering electricity so generated to common power lines.

18. A method of operating a hydroelectric steam power plant including a plurality of electric generators each connected to a hydraulic turbine and to a steam prime mover by a speed reducing mechanism, which method comprises the steps of shutting off the supply of driving water used to revolve a plurality of hydraulic turbines driving electric generators and admitting steam to a plurality of steam prime movers thus revolving said electric generators by steam from a common source of steam.

19. A method of operating a hydroelectric steam power station including a plurality of electric generators each connected to a hydraulic turbine and to a steam prime mover by a speed reducing mechanism, which method comprises the steps of admitting water to a plurality of hydraulic turbines and admitting steam to a plurality of steam turbines and thus revolving a group of electric generators part of the operating time by the movement of water and part of the time by the expansion of steam.

20. A method of operating a hydroelectric steam power station including a plurality of electric generators each connected to a hydraulic turbine and to a steam prime mover by a speed reducing mechanism, which method comprises admitting water to a plurality of hydraulic turbines and admitting steam to a plurality of steam turbines thus revolving a group of electric generators partially by moving water and partially by expanding steam.

21. In an apparatus of the class described, a hydraulic turbine, an electric generator driven by said hydraulic turbine, a steam turbine, a reducing gear connected to said steam turbine and said electric generator forming a driving connection therebetween, control means governing water supplied to said hydraulic turbine, control means governing the amount of steam supplied to said steam turbine, and a clutch for disconnecting and connecting both said control means.

22. In an apparatus of the class described, a hydraulic turbine, an electric generator driven by said hydraulic turbine, a steam turbine, a reducing gear connected to said steam turbine and said electric generator forming a driving connection therebetween, control means controlling water supplied to said hydraulic turbine, control means controlling steam supplied to said steam turbine, and means for interconnecting and disconnecting said control means from each other.

23. In an apparatus of the class described, a hydraulic turbine, an electric generator driven by said hydraulic turbine, a steam turbine, a reducing gear connected to said steam turbine and said electric generator forming a driving connection therebetween, a steam control valve, a water control valve, electrically actuated control means controlling water to be supplied to said turbine and steam to be supplied to said steam turbine, and means for disconnecting the steam control valve and its movement from the water control valve and its movement.

24. In an apparatus of the class described, a hydraulic turbine, an electric generator driven by said hydraulic turbine, a steam turbine, a reducing gear connected to said steam turbine and said electric generator forming a driving connection therebetween, a steam control valve, a water control valve, electric governing controls controlling both said valves, and means for disassociating the movement of said steam control valve from said water control valve.

WALTER DOUGLAS LA MONT.